(12) United States Patent
Jourdain

(10) Patent No.: US 12,547,719 B1
(45) Date of Patent: Feb. 10, 2026

(54) ANOMALY DETECTION USING CHANGE BLOCKS AND DISK EXTENTS

(71) Applicant: Dell Products L.P., Round Rock, TX (US)

(72) Inventor: Gerald M. Jourdain, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 18/775,540

(22) Filed: Jul. 17, 2024

(51) Int. Cl.
*H04L 29/06* (2006.01)
*G06F 11/14* (2006.01)
*G06F 21/56* (2013.01)

(52) U.S. Cl.
CPC ........ *G06F 21/568* (2013.01); *G06F 11/1435* (2013.01); *G06F 21/566* (2013.01)

(58) Field of Classification Search
None
See application file for complete search history.

(56) References Cited

FOREIGN PATENT DOCUMENTS

| CN | 112764968 A | * | 5/2021 | .......... G06F 11/1464 |
|---|---|---|---|---|
| CN | 116450412 A | * | 7/2023 | .......... G06F 11/1458 |
| CN | 118152180 A | * | 6/2024 | .......... G06F 11/1461 |
| CN | 119759656 A | * | 4/2025 | |

* cited by examiner

*Primary Examiner* — Lisa C Lewis
(74) *Attorney, Agent, or Firm* — Workman Nydegger

(57) ABSTRACT

Anomaly detection in data protection operations is disclosed. During a data protection operation, blocks being backed up are sorted and associated with metadata including file system metadata. Anomaly detection operations are performed using the metadata to detect anomalies. More specifically, the blocks are evaluated or analyzed using one or more types of anomaly detection. Remediation actions are performed in response to detected anomalies.

20 Claims, 6 Drawing Sheets

ANOMALY DETECTION USING CHANGE BLOCKS AND DISK EXTENTS

TECHNOLOGICAL FIELD OF THE DISCLOSURE

Embodiments disclosed herein generally relate to data protection operations and data protection systems. More particularly, at least some embodiments relate to systems, hardware, software, computer-readable media, and methods for detecting and/or remediating anomalies in data protection systems and operations.

BACKGROUND

Data protection is conventionally associated with performing backup operations. Backup operations are important for a variety of reasons and most entities ensure that their data is protected for many reasons. The manner in which a backup operation is performed, however, is often dependent on the computing system and the type of protection being performed.

For example, an entity may decide to perform data protection operations regularly. Thus, a backup application may be configured to perform backups periodically. In the case of a block device, the backup application may perform backups using change block tracking (CBT). When using CBT, a particular backup operation copies only the blocks that have changed since a most recent backup. Thus, when performing a backup operation, blocks that have changes are identified, read, and transmitted to a backup system or backup storage. The changed blocks, however, do not necessarily provide any additional information about the state of the computing system or application being protected.

Data protection operations may also be, in effect, the reverse of a backup operation. A restore operation can be performed by retrieving and restoring the latest copy of each block form the backups. A restore operation may retrieve blocks from multiple backups to recover the block device.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings, in which.

DETAILED DESCRIPTION OF SOME EXAMPLE EMBODIMENTS

Figure 1:
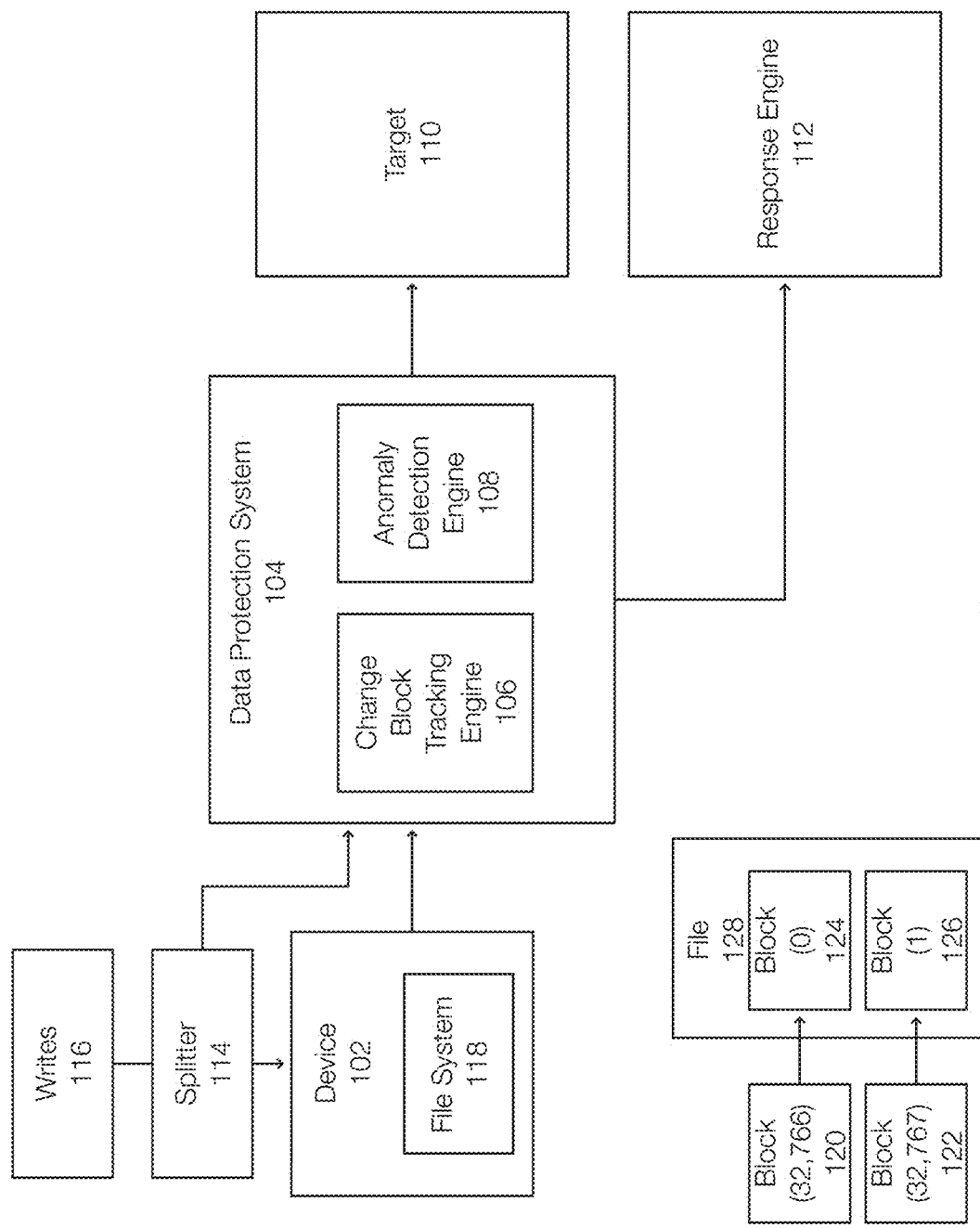
FIG. 1 discloses aspects of aspects of anomaly detection in data protection systems and operations.

Embodiments disclosed herein generally relate to anomaly detection and data protection in computing systems. More particularly, at least some embodiments relate to systems, hardware, software, computer-readable media, and methods for detecting anomalies while performing data protection operations.

Embodiments of the invention generally relate to detecting anomalies in a computing system, the data of a computing system, in an application or the like. The anomalies may be detected in the context of performing data protection operations.

When performing change block tracking for data protection purposes, the set of blocks identified as changed for a given backup are a series or set of unassociated blocks that are effectively copied from a source to a target. Embodiments of the invention incorporate file system information or metadata with change block tracking to perform anomaly detection.

For example, extent information can be combined with change block tracking information to identify files that have changed and to identify which blocks within a file have changed. For example, embodiments of the invention may determine that a changed block is associated with a particular file (e.g., a PDF file). If the changed block is the first block of the PDF file, that block can be evaluated or analyzed for known data patterns that may impact PDF files. Similarly, other blocks of a file, regardless of position within the file, may be similarly evaluated or analyzed. The metadata or file information allows blocks to be evaluated or analyzed for anomalies in the context of the metadata (e.g., file time, block position in file). This may allow anomalies such as malware, ransomware, or other unauthorized actions to be detected in a computing system more efficiently and more quickly.

In addition, because the block has been read into memory for data protection purposes, the data in memory can also be used for entropy detection. This eliminates the need to re-read entire files for anomaly detection. Embodiments of the invention thus relate to including additional information or metadata into the data protection operations, such as change block tracking, to facilitate a high speed, lower resource consumption method that can perform in-line anomaly detection or near in-line anomaly detection.

Embodiments of the invention are discussed in the context of data protection operations, but may be performed with other operations. Embodiments of the invention are also discussed in the context of block devices, but may be implemented in other types of computing systems and/or storage devices.

Generally, embodiments of the invention relate to data protection and anomaly detection. When a data protection operation, such as a backup operation, is performed, a data protection system may identify changed blocks in a block device. The changed blocks may be sorted such that the blocks may be viewed as changed blocks of specific files. Anomaly detection operations can be performed on the sorted or shuffled blocks. The backup operation may proceed to complete the backup operation and an anomaly detection engine may generate alerts or take remedial actions (e.g., corrective, preventative, or other protective actions) based on the detected anomaly.

FIG. 1 discloses aspects of anomaly detection in data protection systems and operations. FIG. 1 illustrates a data protection system 104 that is configured to perform data protection operations, which may include backup operations. Example data protection operations may include full backup operations, incremental backup operations, snapshot operations, point in time related operations, change block tracking operations, bitmap operations, or the like. The data protection system 104 may be an appliance (an integrated system with a data protection application, processors, memory, and the like) and may be physical or virtual.

In this example, the data protection system 104 includes a change block tracking engine 106 that is configured to track changes to blocks in a device 102, which may be a block disk drive or block based storage system. In one example, the data protection system 104 may operate in conjunction with a splitter 114 such that writes 116 can be intercepted or evaluated in a manner that allows changed blocks on the device 102 to be tracked. For example, a bitmap or other structure may be used to track changed blocks.

When a backup operation is performed, the blocks that have changed since a most recent backup are read and transmitted to the storage 110 as a backup (e.g., snapshot, incremental backup, point in time backup). The bitmap or other tracking mechanism identifies the blocks (dirty blocks) to include in the backup.

FIG. 1 also illustrates an anomaly detection engine 108 that has an understanding of or access to a file system 118 of or associated with the device 102. The anomaly detection engine 108 may be configured to sort or shuffle the changed blocks into files based on the file system 118.

For example, the changed blocks may include blocks 120 and 122 (blocks 32,766 and 32,767 of the device 102. The anomaly detection engine 108 is configured to determine that these blocks correspond to blocks 124 and 126, which are blocks 0 and 1 of the file 128 in the file system 118. The anomaly detection engine 108 allows arbitrary block numbers to be viewed as specific blocks within specific files.

The ability to view changed blocks as blocks of specific files enables various operations to be performed including, by way of example only, application detection and validation operations, write pattern matching operations, entropy related operations, attack detection operations, data pattern matching operations, and the like.

Figure 2:
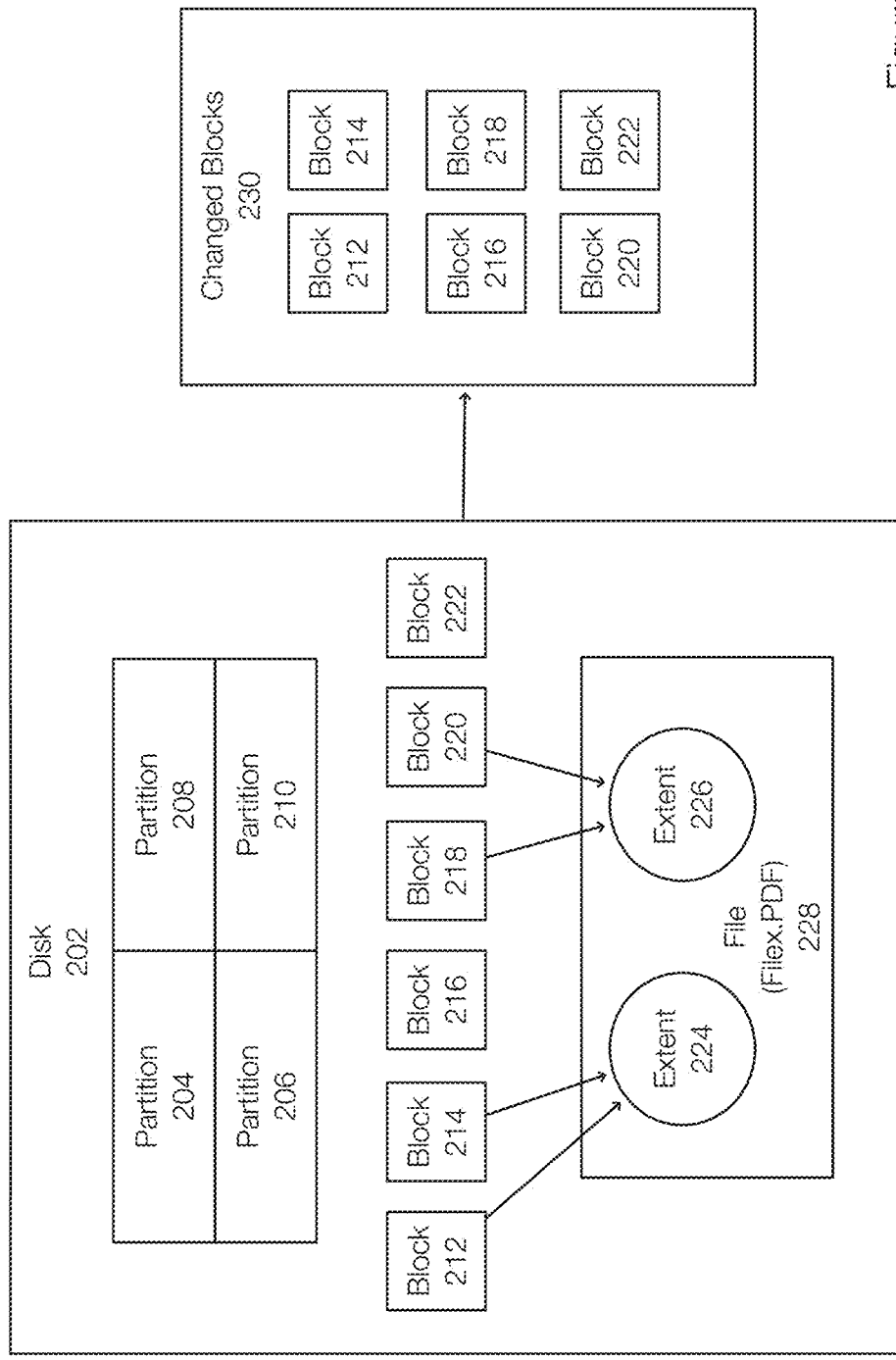
FIG. 2 discloses aspects of anomaly detection in the context of data protection operations.

FIG. 2 discloses additional aspects of anomaly detection in the context of data protection operations. FIG. 2 illustrates a disk 202, which may be representative of a block device or a block based storage system. In this example, the disk 202 includes partitions, represented by the partitions 204, 206, 208, and 210. The partition 204 includes a file system and a set of files. The partitions 206, 208, and 210 are similarly configured.

Each file in the partition 204 includes a set of contiguous areas on the disk referred to as extents. In this example, the file 228 (e.g., FileX.pdf) is associated with an extent 224 and an extent 226. Each of the extents 224 and 226 may have multiple blocks. While the blocks of the extents 224 are contiguous on the disk 202, the extents 224 and 226 may or may not be contiguous on the disk 202.

When a data protection operation is performed, the data protection operation may be performed for the disk 202 as a whole or for one or more partitions. For example, the partition 204 may be associated with a particular application and backing up the application includes backing up the partition 204.

In this example, the change block tracking engine of the data protection system may determine that blocks 212, 214, 216, 218, 220, and 222 have changed since a most recent backup. Thus, for a current backup operation, the changed blocks 230 are identified, read, from the disk 202 and transmitted to the target storage system.

The changed blocks 230 may be sorted using metadata. Thus, the blocks 212 and 214 correspond to the extent 224 and to the file 228. The blocks 218 and 220 correspond to the extent 226 and to the file 228. During anomaly detection, the blocks 212, 214, 218, and 220 can be evaluated in the context of the file 228 and their positions within the file 228 and/or in the context of other metadata.

Figure 3:
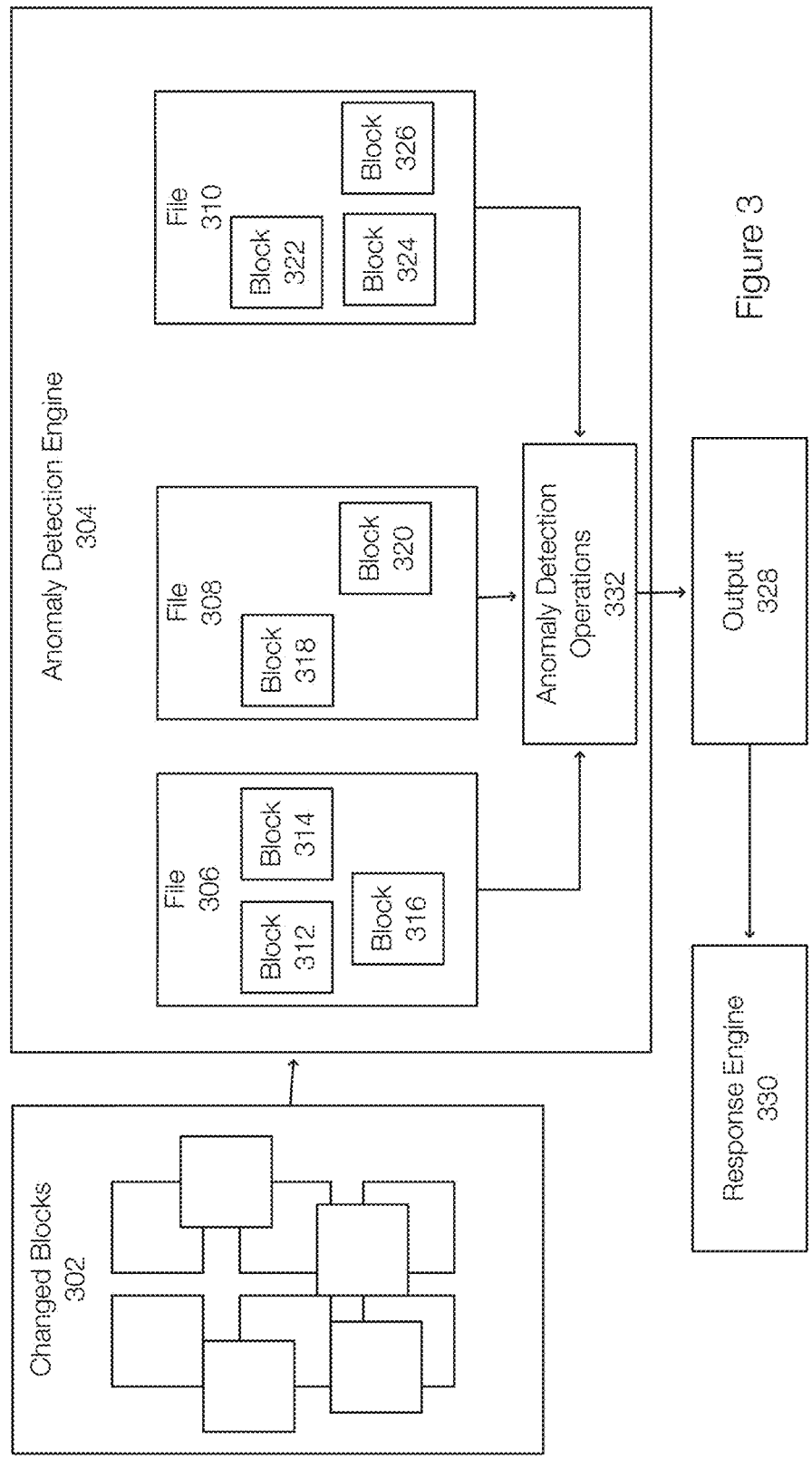
FIG. 3 discloses additional aspects of anomaly detection in data protection operations.

FIG. 3 discloses additional aspects of anomaly detection in data protection operations. FIG. 3 illustrates changed blocks 302 (e.g., the changed blocks 230), which were identified as blocks of a block device or storage system that have changed since a recent backup of the block device or storage system.

The anomaly detection engine 304 performs a sorting operation or a shuffling operation to correlate the changed blocks 302 to specific files of a disk or partition, represented by the files 306, 308, and 310. In this example, the changed blocks 312, 314, and 316 correspond to the file 306, the changed blocks 318 and 320 correspond to the file 308, and changed blocks 322, 324, and 326 correlate to the file 310.

The anomaly detection engine 304 thus correlates specific changed blocks to specific files. Further, the block positions with respect to the files are known. For example, the blocks 312 and 314 may be blocks 0 and 1 of the file 306 while the block 316 may be block 40.

Once the sorting operation is completed, an anomaly detection 332 may be performed with respect to the files 306, 308, and 310. The anomaly detection operations 332 may generate an output 328. The output 328 may identify the detected anomalies, or potential anomalies or a likelihood that an anomaly is real or a threat. A response engine 330 may be configured to perform protective actions or operations based on the output 328. For example, the response engine 330 may terminate writes to the block device, quarantine a file or set of files, generate alerts, lock files, expel users, terminate processes, or the like or combinations thereof.

Figure 4:
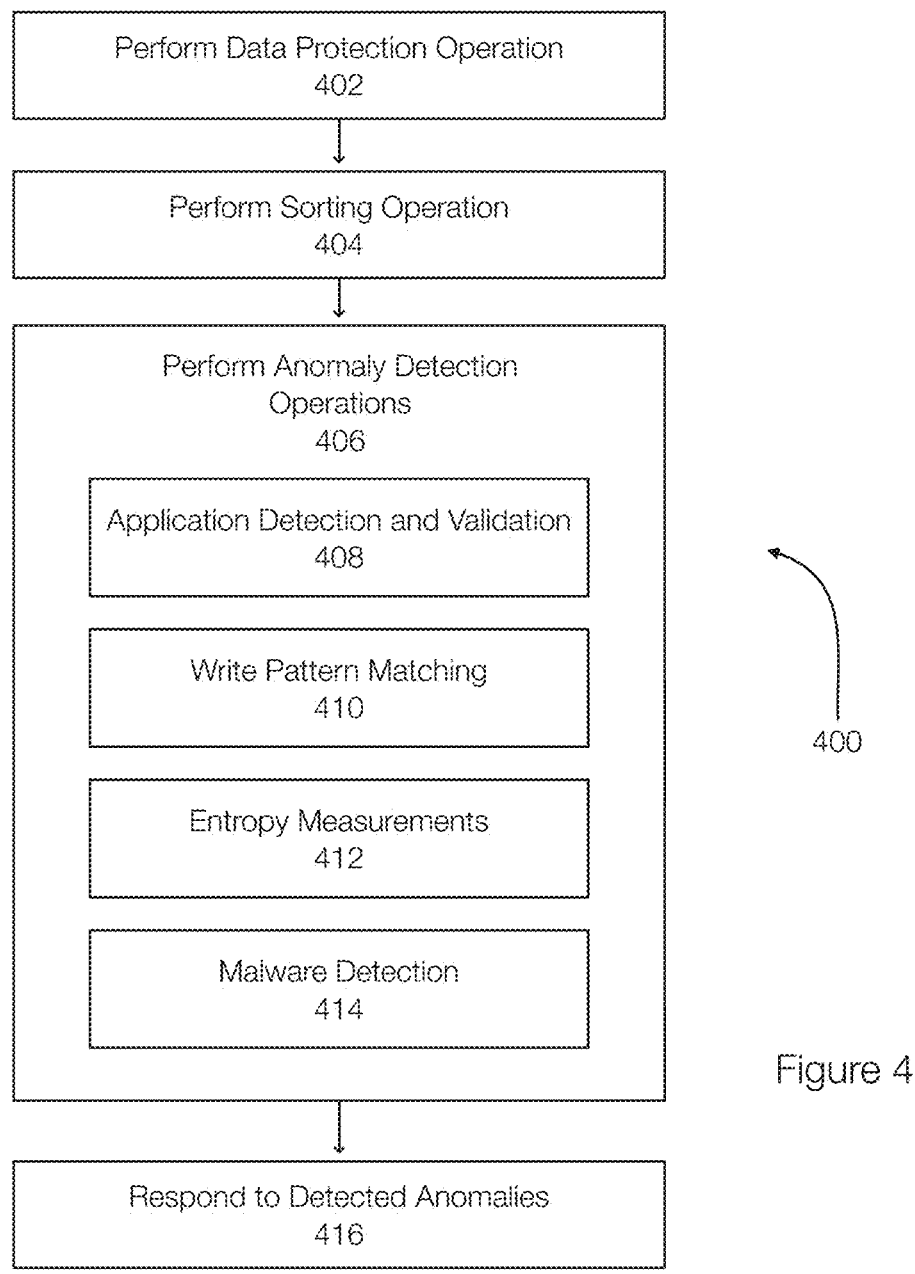
FIG. 4 discloses aspects of methods for anomaly detection.

FIG. 4 discloses aspects of data protection and anomaly detection in a computing system. The method 400 includes performing 402 a data protection operation in a computing system. The data protection operation may be performed continuously, periodically, when triggered, or the like. When the data protection operation generates data including changed blocks, a sorting operation is performed 404. The sorting operation correlates the changed blocks to specific files in the file system of the block device or storage system.

Once the changed blocks are correlated to files, anomaly detection operations may be performed 406. In one example, an application detection and validation operation 408 is performed. For example, understanding the part of a file that has changed allow various aspects of the file to be examined. If one of the changed blocks of a file is block 0 of the file, certain aspects of the file are known and can be validated. For example, file headers, application signatures, magic numbers, encoding schemes, and the like can be validated. If a file has an extension (e.g., PDF) and the signature has been obscured, this can be detected by the detection and validation operation 408. Incorrect headers, missing or invalid signatures, or the like can be detected and a corresponding output can be generated.

A write pattern matching operation 410 may be performed. Some ransomware have been known to attack only parts of a file with the intent of circumventing detection. These ransomware may leave the first 10 blocks of the file alone, for example. By encrypting only parts of the file, the ransomware preserve the application signature and decreases the amount of entropy changes, which may allow the ransomware to stay within detection thresholds. Detecting these types of patterns (detecting that blocks after block 10 have been changed in a file) may be performed by the anomaly detection engine and a corresponding output or alarm may be generated. Understanding a relationship between the physical changed block (e.g., block 32,766) and the changed block of the file (e.g., block 10 of file X) allows write patterns to be identified from a file perspective. For example, the anomaly detection engine may detect that a relatively large number of files all started changing at block 10, for example. Thus, patterns within a file and across multiple files can be detected when the changed blocks are correlated to specific files.

Entropy measurement operations 412 may be performed. Entropy, by way of example measures randomness of a data stream and can be used to detect encryption. More specifically the integrity or entropy of a backup can be performed by interrogating a completed backup and reading file content, passing file content through an entropy algorithm and determining whether the output falls within a certain threshold to determine likelihood of encrypted data.

This approach, however, consumes IO (input/output), memory, and CPU (central processing unit) resources. Much of the IO is wasted when most of the blocks have not been changed.

However, because the changed blocks pertaining to a particular file are known and because these blocks are in memory, entropy measurements can be performed without rereading the data and without crossing over to other files.

More specifically, knowing which blocks belong to a file and having those blocks in memory allows operations like entropy measurement operations to be run without re-reading the data and without crossing over to other files. If all the changed data is aggregated together and entropy measurement is performed, the results would likely be far lower than running on a particular file.

Malware detection operations 414 may also be performed. There are thousands of known file extensions/filename patterns of different ransomware attacks. Although detecting an anomaly using filename pattern matching does not catch all ransomware attacks, this is still quite valuable. The list needs of extensions/filename patterns should be updated regularly.

More specifically, ransomware attacks files and needs to be able to identify which files have been attacked to undo the attack after the ransom is paid. Understanding how the ransomware tags the attacked files allows a response to the attack to be performed. Filename pattern detection can be used not only for identifying certain flavors of ransomware attacks but also for helping to identify file type. For example, the malware detection operations may be able to identify file type (e.g., PDF, Office document). Translating to mime types also adds the ability to identify audio, video, pictures, and the like.

In some instances, ransomware may attack non-executable data files. Knowing file types and which blocks belong to them enables a more targeted encryption detection process.

If anomalies are detected, the method 400 may respond 416 to detected anomalies.

Figure 5:
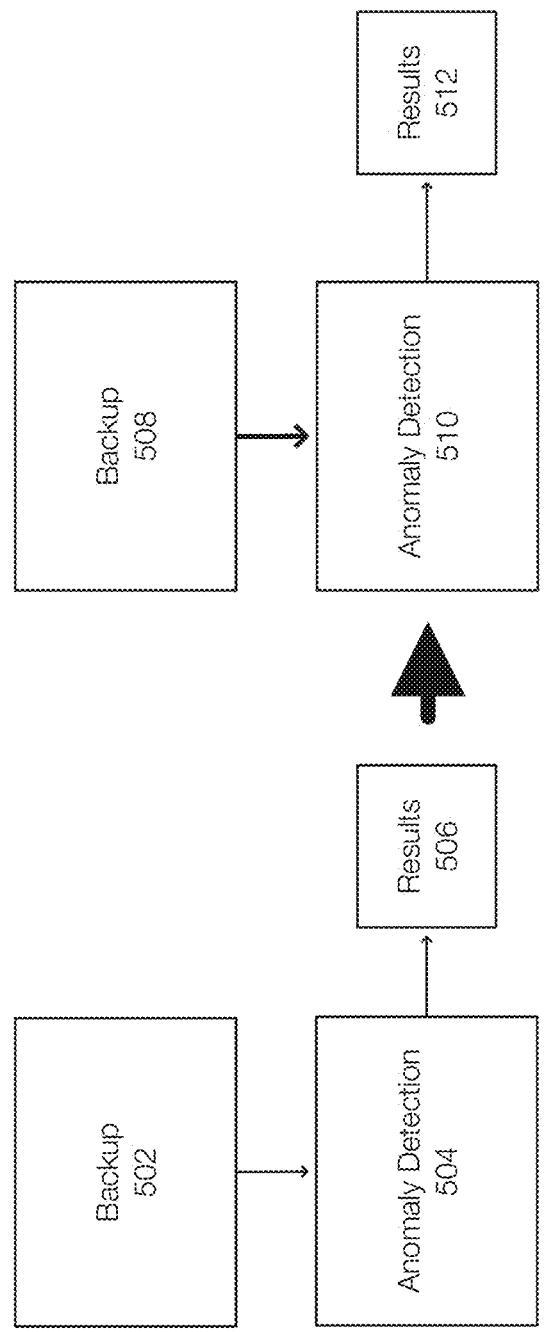
FIG. 5 discloses aspects of incorporating historical data into anomaly detection operations.

FIG. 5 discloses aspects of incorporating historical data into anomaly detection operations. FIG. 5 illustrates a backup 502 generated, for example, at day 0 of a deployment. Anomaly detection 504 is performed on the backup 504 and results 506 are generated. When a subsequent anomaly detection operation 510 is performed on a subsequent backup 508, the results 506 can be incorporated into the anomaly detection operation. Results 512 are generated by the anomaly detection operation 510.

More specifically, an attempt to detect anomalies on day 0 has a higher probability of generating false positives. To resolve this problem, anomaly detection results are saved and may be used on subsequent anomaly detection operations performed on subsequent backups. As more backup history (e.g., results 506) is incorporated, the anomaly detection operation improves its ability to detect anomalies.

For example, when detecting entropy for a file, the history or results may include or demonstrate a historical entropy for the file. This historical data can be used to train the anomaly detection operation such that the operation improves over time. For example, the historical data allows the entropy to be evaluated more effectively. A high entropy may be normal if the historical entropy is high. A changed signature may be normal if the signature has been previously changed one or more times. Historical information, or results, allows anomalies to be detected more effectively.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, data protection operations, anomaly detection operations, entropy related operations, application detection and validation operations, write pattern matching operations, malware detection operations, or the like or combinations thereof. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable perform operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments may be employed include, but are not limited to, Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients or appliances that may be capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, appliances, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' is intended to be broad in scope. Example embodiments are applicable to any system capable of storing and handling various types of objects, in analog, digital, or other form.

It is noted that any operations of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1. A method for performing anomaly detection, the method comprising: performing a data protection operation in a computing system to generate a backup that includes blocks stored in a block device, sorting the blocks such that metadata is associated with the blocks, performing, by an anomaly detection engine, anomaly detection operations on the blocks using the metadata to detect anomalies, and responding to the anomalies detected in the blocks by the anomaly detection operations by performing remediation actions.

Embodiment 2. The method of embodiment 1, further comprising performing change block tracking, wherein the blocks include blocks on a storage system that have changed since a most recent backup.

Embodiment 3. The method of embodiment 1 and/or 2, wherein sorting the blocks includes correlating the blocks to files, wherein the metadata includes file system metadata.

Embodiment 4. The method of embodiment 1, 2, and/or 3, wherein the metadata includes file type, file name, and/or block position within file.

Embodiment 5. The method of embodiment 1, 2, 3, and/or 4, wherein the anomaly detection includes performing application detection and validation operations to detect the anomalies and/or write pattern matching to detect the anomalies.

Embodiment 6. The method of embodiment 1, 2, 3, 4, and/or 5, wherein the application detection and validation operations include determining that file headers, application signatures, magic numbers, encoding schemes and signatures are validated, wherein write pattern matching includes comparing patterns within a block and/or with respect to multiple blocks associated with multiple files.

Embodiment 7. The method of embodiment 1, 2, 3, 4, 5, and/or 6, wherein the anomaly detection includes performing entropy measurement operations to detect the anomalies and/or malware detection operations to detect the anomalies.

Embodiment 8. The method of embodiment 1, 2, 3, 4, 5, 6, and/or 7, wherein entropy measurement operations includes determining whether an entropy is within a threshold entropy to determine a likelihood of encrypted data, wherein malware detection operations include identifying known malware patterns and/or known malware tags.

Embodiment 9. The method of embodiment 1, 2, 3, 4, 5, 6, 7, and/or 8, further comprising incorporating results from a previous anomaly detection into the anomaly detection operations.

Embodiment 10. The method of embodiment 1, 2, 3, 4, 5, 6, 7, 8, and/or 9, wherein remediation actions include one or more of generating an alert, terminating writes to the block device, quarantining a file or set of files, locking files, expelling users, terminating processes, or the like or combinations thereof.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 6:
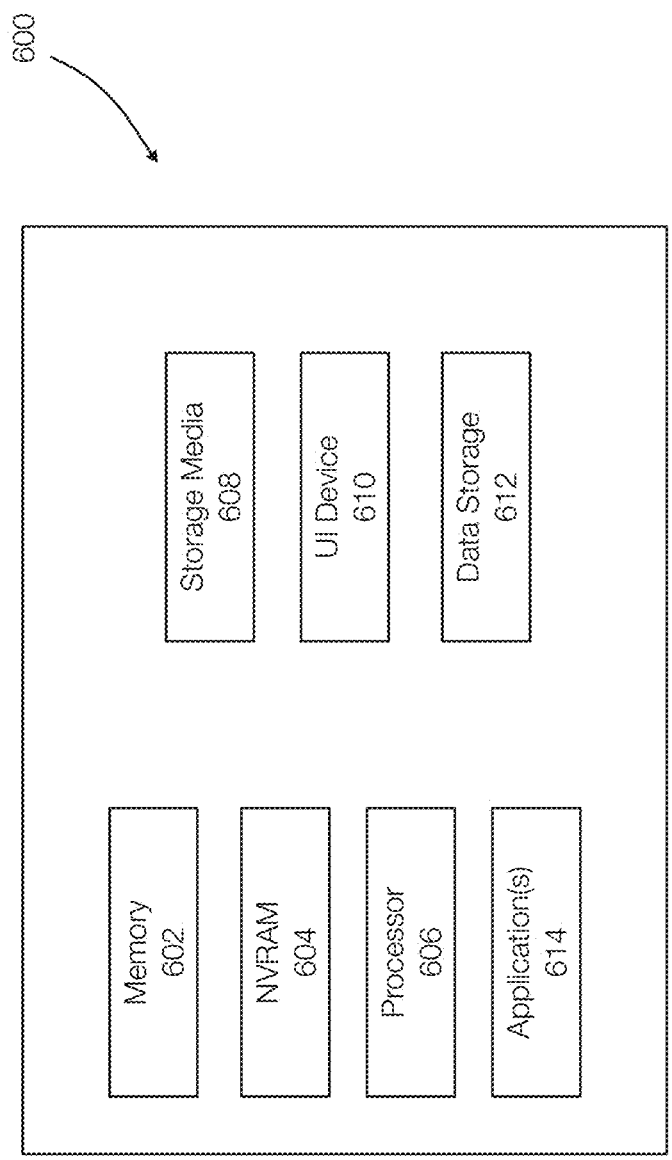
FIG. 6 discloses aspects of a computing device, system, or entity.

With reference briefly now to FIG. 6, any one or more of the entities disclosed, or implied the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6. The device 600 may alternatively represent a server, a cluster, an edge computing environment, a cloud computing environment or the like.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for performing anomaly detection, the method comprising:
   performing a data protection operation in a computing system to generate a backup that includes blocks stored in a block device;
   sorting the blocks such that metadata is associated with the blocks;
   performing, by an anomaly detection engine, anomaly detection operations on the blocks using the metadata to detect anomalies; and
   responding to the anomalies detected in the blocks by the anomaly detection operations by performing remediation actions.

2. The method of claim 1, further comprising performing change block tracking, wherein the blocks include blocks on a storage system that have changed since a most recent backup.

3. The method of claim 1, wherein sorting the blocks includes correlating the blocks to files, wherein the metadata includes file system metadata.

4. The method of claim 3, wherein the metadata includes file type, file name, and/or block position within file.

5. The method of claim 1, wherein the anomaly detection includes performing application detection and validation operations to detect the anomalies and/or write pattern matching to detect the anomalies.

6. The method of claim 5, wherein the application detection and validation operations include determining that file headers, application signatures, magic numbers, encoding schemes and signatures are validated, wherein write pattern matching includes comparing patterns within a block and/or with respect to multiple blocks associated with multiple files.

7. The method of claim 1, wherein the anomaly detection includes performing entropy measurement operations to detect the anomalies and/or malware detection operations to detect the anomalies.

8. The method of claim 7, wherein entropy measurement operations includes determining whether an entropy is within a threshold entropy to determine a likelihood of encrypted data, wherein malware detection operations include identifying known malware patterns and/or known malware tags.

9. The method of claim 1, further comprising incorporating results from a previous anomaly detection into the anomaly detection operations.

10. The method of claim 1, wherein remediation actions include one or more of generating an alert, terminating writes to the block device, quarantining a file or set of files, locking files, expelling users, terminating processes, or the like or combinations thereof.

11. A non-transitory storage medium having stored therein instructions that are executable by one or more hardware processors to perform operations for performing anomaly detection, the operations comprising:
   performing a data protection operation in a computing system to generate a backup that includes blocks stored in a block device;
   sorting the blocks such that metadata is associated with the blocks;
   performing, by an anomaly detection engine, anomaly detection operations on the blocks using the metadata to detect anomalies; and
   responding to the anomalies detected in the blocks by the anomaly detection operations by performing remediation actions.

12. The non-transitory storage medium of claim 11, further comprising performing change block tracking, wherein the blocks include blocks on a storage system that have changed since a most recent backup.

13. The non-transitory storage medium of claim 11, wherein sorting the blocks includes correlating the blocks to files, wherein the metadata includes file system metadata.

14. The non-transitory storage medium of claim 13, wherein the metadata includes file type, file name, and/or block position within file.

15. The non-transitory storage medium of claim 11, wherein the anomaly detection includes performing application detection and validation operations to detect the anomalies and/or write pattern matching to detect the anomalies.

16. The non-transitory storage medium of claim 15, wherein the application detection and validation operations include determining that file headers, application signatures, magic numbers, encoding schemes and signatures are validated, wherein write pattern matching includes comparing patterns within a block and/or with respect to multiple blocks associated with multiple files.

17. The non-transitory storage medium of claim 11, wherein the anomaly detection includes performing entropy measurement operations to detect the anomalies and/or malware detection operations to detect the anomalies.

18. The non-transitory storage medium of claim 17, wherein entropy measurement operations includes determining whether an entropy is within a threshold entropy to determine a likelihood of encrypted data, wherein malware detection operations include identifying known malware patterns and/or known malware tags.

19. The non-transitory storage medium of claim 11, further comprising incorporating results from a previous anomaly detection into the anomaly detection operations.

20. The non-transitory storage medium of claim 11, wherein remediation actions include one or more of generating an alert, terminating writes to the block device, quarantining a file or set of files, locking files, expelling users, terminating processes, or the like or combinations thereof.

* * * * *